June 3, 1958  J. MÜLLER  2,837,348
AUXILIARY CHASSIS MEMBER FOR A VEHICLE
Filed Dec. 16, 1955
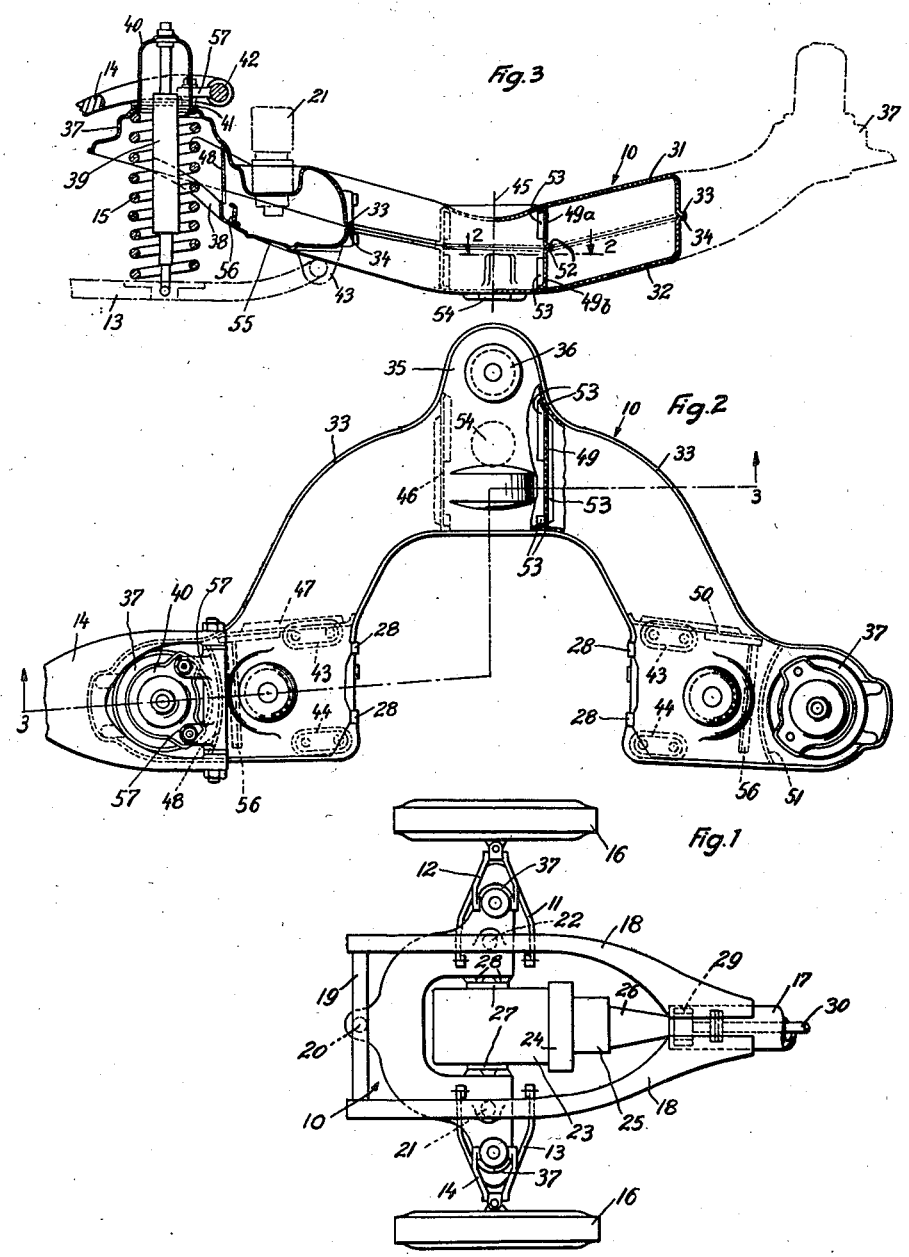
Inventor
JOSEF MÜLLER
BY Dike and Craig
ATTORNEYS

United States Patent Office

2,837,348
Patented June 3, 1958

2,837,348

AUXILIARY CHASSIS MEMBER FOR A VEHICLE

Josef Müller, Stuttgart, Germany, assignor to Daimler-Benz Aktiengesellschaft, Stuttgart-Untertürkheim, Germany Application December 16, 1955, Serial No. 553,574

Claims priority, application Germany December 20, 1954

9 Claims. (Cl. 280—106)

My invention relates to an auxiliary chassis member for a vehicle and, more particularly, to a substantially horizontal hollow sheet metal member of horseshoe shape adapted to support the body of a motor vehicle by interposed cushions and being itself supported on the wheels of the vehicle by suitable suspension means.

The use of such a hollow sheet metal member of this kind in motor vehicles offers the advantage of permitting easy and quick disassembly of the front wheel-suspending means and of the engine from beneath the body of the vehicle, since the hollow sheet metal member together with the wheel-suspending means and the engine carried thereby constitutes a unit which may be easily attached or detached from the body of the vehicle. Its horseshoe shape offers the advantage that the hollow sheet metal member may easily embrace and thus accommodate the engine thus taking up the reactionary driving torque produced by the latter.

Such a hollow sheet metal member of horseshoe shape, however, is subject to extreme stresses. This is particularly true where the wheels are independently suspended from the hollow sheet metal member and where the latter serves to support the engine unit. Because of its horseshoe shape and because of its resilient connection to the body of the vehicle and of the resilient mounting of the engine unit thereon, the hollow horseshoe sheet metal member is not reinforced by the body of the vehicle nor by the engine unit and is, therefore, liable to be subjected to excessive deformation under the effect of the stresses set up therein, particularly where such stresses tend to relatively twist the arms of the hollow horseshoe member.

It is the object of the present invention to improve the strength and stiffness of the hollow sheet metal member without materially increasing its dimensions and its weight and the cost of its manufacture.

It is a further object of the invention to provide an improved hollow sheet metal member of horseshoe shape serving an an auxiliary chassis member for motor vehicles which affords excellent support to front wheel suspension links and springs and to an engine of a motor vehicle and combines great strength with a minimum of weight and dimensions and, therefore, requires attachment to the body of the vehicle at three points only by resilient cushions which will minimize the transfer of noise and vibration to the body of the vehicle from the wheels and the engine.

Further objects of my invention will appear from a detailed description of a preferred embodiment of the invention following hereinafter, and the features of novelty will be pointed out in the claims, it being understood that such detail description serves the purpose of illustrating the invention rather than that of restricting or limiting the same. In the drawings, Fig. 1 is a more or less diagrammatical plan view of the front end of the chassis of a motor vehicle provided with the improved auxiliary chassis member, Fig. 2 is a plan view of the auxiliary chassis member shown on an enlarged scale, partly shown in section along the line 2—2 of Fig. 3, and Fig. 3 is an elevation partly shown in section along the broken line 3—3 indicated in Fig. 2 and viewed in the direction of the arrows inserted in Fig. 2.

Fig. 1 indicates the front end of a vehicle comprising a substantially hollow horizontal sheet metal member 10 which is supported by wheel-carrying means including two pairs of wishbone links 11, 12 and 13, 14, associated helical springs 15, and wheels 16, and itself supports the body of the vehicle. In Fig. 1 part of the body only is shown, such part comprising a chassis 17, 18 and 19 carrying a suitable superstructure. More particularly, such chassis comprises a central longitudinal tubular beam 17, a pair of spaced forwardly extending arms 18 fixed to the front end thereof, and a transverse member 19 connecting the front ends of the arms 18. The hollow sheet metal member 10 carries three cushions 20, 21 and 22 of rubber or a similar material, the cushion 20 being disposed in the central longitudinal vertical plane of the vehicle and supporting the transverse frame member 19 in its center, whereas the cushions 21 and 22 support the chassis arms 18. In this manner, transfer of noise and vibration from the hollow sheet metal member 10 to the body of the vehicle is reduced to a minimum. Upon detachment of the rubber cushions 20, 21 and 22 from the body of the vehicle, the horseshoe-shaped sheet metal member 10 with the wheel-suspending means 11, 12, 13 and 14 and with the wheels 16 may be pulled out from under the body of the vehicle as a unit for inspection and repair. Preferably, the driving unit comprising the engine 23, the housing 24 of the flywheel and the transmission casing 25 having an extension 26 is likewise supported by the horseshoe member 10 through the intermediary of suitable rubber cushions 27 mounted on inner projections 28 of the horseshoe member.

The rear end of the driving unit is supported on the beam 17 by means of an annular rubber member 29. The driving unit operates a universal shaft 30 extending through the tubular beam 17 and driving the rear wheels of the vehicle not shown.

The hollow horseshoe member is preferably composed of an upper section 31 and of a lower section 32, each section having a channel profile and being provided with marginal flanges 33 and 34 which engage each other and are preferably welded. Both sections are provided with registering forwardly extending projections 35, the projection of the upper section 31 being provided with a circular depression 36 adapted to accommodate the rubber cushion 20. Moreover, the arms of the horseshoe-shaped hollow sheet metal member 10 are provided at their ends with laterally extending projections 37 formed by the upper section 31 thereof. The projections 37 have the shape of inverted cups adapted to rest on the tops of the helical springs 15 which, in their turn, rest on the lower wishbone links 11 and 13 respectively. The lower sections 32, however, are formed with marginal portions 38 (Fig. 3) which are welded to the lower edges of the cup-shaped projections 37 to reinforce the same and to better transfer the weight of the vehicle to such cup-shaped projection 37. Telescopic shock absorbers 39 disposed coaxially within the helical springs 15 connect the lower wishbone links 11, or 13 respectively, with the bottoms of cup-shaped sheet metal members 40 which have their flanges 41 welded to the cup-shaped projections 37. The pivot pins 42 carrying the upper links 12 and 14 are journalled in brackets 57 which are bolted to suitable portions of the flanges 41. The lower wishbone links 11 and 13 are pivotally mounted on brackets 43 and 44 which are suitably welded to the bottom face of the horseshoe member near the ends of the arms thereof, as will appear from Fig. 2.

Thus, it will appear that the hollow sheet metal member is symmetrically shaped with respect to the vertical central longitudinal plane 45 of the body.

For the purpose of increasing the strength and rigidity of the hollow sheet metal member 10 without materially increasing its weight and its dimensions, the member 10 is reinforced by internal bulkheads. Preferably, two groups of such bulkheads are symmetrically disposed with respect to the plane 45, one group comprising bulkheads 46, 47 and 48 and the other group comprising the bulkheads 49, 50 and 51. It will be noted that the bulkheads 46 and 49 extend substantially parallel to each other and to the plane 45 equally spaced from the latter in such positions as to constitute lateral confinements of the central projections 35. The bulkheads 47 and 50, however, extend transversely to the central plane 45 and confine the projections 37 of the arms of the horseshoe member laterally. The bulkheads 48 and 51 are slightly curved extending fore and aft of the vehicle on the inside of the projections 37 being preferably welded to the flanges 38 of the lower section 32. Thus, the bulkheads 48 and 51 will seal the interior of the open cups 37 from the interior of the horseshoe arms of member 10.

Preferably, the bulkheads are horizontally split so as to be composed of an upper section, such as 49a, and of a lower section, such as 49b, as shown in Fig. 3. These sections have adjoining flanges 52 which are welded to each other and have peripheral flanges 53 which are welded to the internal surface of member 10. In order to facilitate the welding operation, the hollow sheet metal member 10 is preferably provided with openings, such as 54 and 55, affording access to the bulkheads for welding the sections of the latter to each other and to the internal surface of the hollow sheet metal member 10. The openings 55 are preferably disposed beneath the rubber cushions 21 and 22 and may thus serve the purpose of introducing the means for attaching the rubber cushions to the body of the vehicle.

It will be noted from Fig. 2 that the brackets 43 carrying the wishbone links 11, or 13 respectively, are disposed in substantial registry with the bulkheads 47, or 50 respectively. This offers the advantage that the forces transmitted by the wishbone links to the member 10 will be directly taken up by the bulkheads 47, or 50 respectively, and are thus uniformly transmitted to the sheet metal walls of member 10. If desired, the brackets 43 may be welded directly to the bulkheads 47, or 50 respectively, extending through suitable openings provided in the bottom of section 32 of the sheet metal member 10.

The described embodiment is capable of numerous modifications. Thus, reinforcing ribs 56 may be added.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a body, a hollow sheet metal member having horseshoe shape and being reinforced by internal bulkheads and adapted to support said body, resilient means connecting said sheet metal member to said body, and wheel-carrying means connected to and supporting said member.

2. In a vehicle, the combination comprising a body, a substantially horizontal hollow sheet metal member adapted to support said body, resilient means connecting said member to said body, said hollow sheet metal member having horseshoe shape symmetrical with respect to the vertical central longitudinal plane of said body and being reinforced by two groups of internal bulkheads disposed symmetrically with respect to said plane, and wheel-carrying means connected to and supporting said hollow sheet metal member.

3. The combination claimed in claim 2 in which said wheel-carrying means comprises two independent sets of elements disposed symmetrically with respect to said plane, each set of said elements including a pair of links and a spring.

4. The combination claimed in claim 2 in which said hollow sheet metal member is formed with projections at the ends of its arms and at its center, said internal bulkheads being disposed to constitute lateral confinements of said projections, said projections at the ends of said arms having the shape of inverted cups.

5. In a vehicle, the combination comprising a body, a substantially horizontal hollow sheet metal member adapted to support said body and disposed therebeneath, resilient means interposed between and connecting said member and said body, said hollow sheet metal member having horseshoe shape symmetrical with respect to the vertical central longitudinal plane of said body and being reinforced by two groups of internal bulkheads disposed symmetrically with respect to said plane, and two independent sets of wheel-carrying elements disposed symmetrically with respect to said plane and connected to and supporting said hollow sheet metal member, each set of elements including a pair of links and a spring, said hollow sheet metal member being formed with first projections at the ends of its arms and with a second projection at its center, each of said first projections being supported by said spring, said resilient means including a cushion of rubber-like material mounted on said second projection.

6. The combination claimed in claim 2 in which said bulkheads are welded to the internal surface of said hollow sheet metal member.

7. In a vehicle, the combination comprising a body, a substantially horizontal hollow sheet metal member adapted to support said body, resilient means connecting said member to said body, said hollow sheet metal member having horse-shoe shape symmetrical with respect to the vertical central longitudinal plane of said body and being reinforced by two groups of internal bulkheads disposed symmetrically with respect to said plane, said hollow sheet metal member and said bulkheads being composed of an upper section and of a lower section, said sections being welded to each other along seams substantially coextensive with the outer inner walls of said hollow sheet metal member and with said bulkheads, and wheel-carrying means connected to and supporting said hollow sheet metal member.

8. In a vehicle, the combination comprising a body, a substantially horizontal hollow sheet metal member adapted to support said body, resilient means connecting said member to said body, said hollow sheet metal member having horse-shoe shape symmetrical with respect to the vertical central longitudinal plane of said body and being reinforced by two groups of internal bulkheads disposed symmetrically with respect to said plane, said hollow sheet metal member being provided with openings affording access to said bulkheads for welding the sections of the latter to each other and to the internal surface of said hollow sheet metal member, and wheel-carrying means connected to and supporting said hollow sheet metal member.

9. In a vehicle, the combination comprising a body, a substantially horizontal hollow sheet metal member adapted to support said body and disposed therebeneath, resilient means interposed between and connecting said member and said body, said hollow sheet metal member having horse-shoe shape symmetrical with respect to the vertical central longitudinal plane of said body and being reinforced by two groups of internal bulkheads disposed symmetrically with respect to said plane, two independent sets of wheel-carrying elements disposed symmetrically with respect to said plane and connected to and supporting said hollow sheet metal member, each set of elements including a pair of links and a spring, said hollow sheet metal member being formed with first projections at the ends of its arms and with a second projection at its center, each of said first projections being supported by said spring, said resilient means including a cushion of rubber-like material mounted on said second projection, and brackets carrying at least part of said links and being fixed to said hollow sheet metal member substantially in registry with said bulkheads.

References Cited in the file of this patent

UNITED STATES PATENTS

| | | |
|---|---|---|
| 2,708,003 | Nallinger | May 10, 1955 |
| 2,747,887 | Schilberg | May 29, 1956 |